United States Patent [19]

Geck et al.

[11] 4,190,406
[45] Feb. 26, 1980

[54] APPARATUS FOR POSITIONING AND CURING A PRE-SHAPED TIRE CARCASS

[75] Inventors: Joseph C. Geck; Floyd E. Hamilton, both of Detroit, Mich.

[73] Assignee: Uniroyal, Inc., New York, N.Y.

[21] Appl. No.: 926,051

[22] Filed: Jul. 19, 1978

Related U.S. Application Data

[63] Continuation of Ser. No. 730,414, Oct. 7, 1976, abandoned.

[51] Int. Cl.² ............................................. B29H 5/02
[52] U.S. Cl. ...................................... 425/38; 425/33; 425/36
[58] Field of Search ............................ 425/33, 38, 36

[56] References Cited

U.S. PATENT DOCUMENTS

| | | | |
|---|---|---|---|
| 2,997,738 | 8/1961 | Soderquist | 425/38 X |
| 3,229,329 | 1/1966 | Heston et al. | 425/38 X |
| 3,380,115 | 4/1968 | Soderquist | 425/38 |
| 3,471,895 | 10/1969 | Ulm et al. | 425/38 X |
| 3,564,649 | 2/1971 | Soderquist | 425/38 X |
| 3,640,653 | 2/1972 | Laenen et al. | 425/38 X |
| 4,025,251 | 5/1977 | Contarutti | 425/38 X |

FOREIGN PATENT DOCUMENTS

1096189 12/1967 United Kingdom ............ 425/36

*Primary Examiner*—J. Howard Flint, Jr.

*Attorney, Agent, or Firm*—Norbert P. Holler; Charles A. Blank

[57] ABSTRACT

Apparatus for positioning a partially shaped, uncured tire carcass and a tire curing bladder of a lower half-section of a vulcanization mold relative to one another, is disclosed. The apparatus includes the lower half-section of a vulcanization mold from which an inflatable, tire curing bladder extends axially upwardly, the bladder being axially and radially expansible and contractible. A bladder-controlling piston rod is associated with the lower half-section and is used to axially elongate the bladder and thereby radially contract the latter. A circumferentially expansible-contractible tire carcass transporter is associated with the lower half-section and is effective to position a generally toroidally shaped, uncured tire carcass concentrically around the bladder, with the lower bead of the tire in contact with the upper inner surface of the lower half-section. A downwardly projecting cylinder and piston rod assembly is carried concentrically in and by the tire carcass transporter. The piston rod thereof when protracted is axially engageable with the aforementioned bladder-controlling piston rod to cause the latter to retract and thereby radially swell and fit the bladder into the interior of the uncured tire carcass. Steam injected into the bladder is used to assist the swelling of the latter, and subsequently to in part cure the tire carcass after it is released by the transporter and covered by an upper half-section of the mold.

12 Claims, 6 Drawing Figures

APPARATUS FOR POSITIONING AND CURING A PRE-SHAPED TIRE CARCASS

This is a continuation, of application Ser. No. 730,414, filed Oct. 7, 1976, now abandoned.

This abstract is not to be taken either as a complete exposition or as a limitation of the present invention, the full nature and extent of the invention being discernible only by reference to and from the entire disclosure.

BACKGROUND OF THE INVENTION

This invention relates generally to apparatus for properly positioning and interfitting an uncured tire carcass and a tire curing bladder of a vulcanization mold relative to one another, and more particularly to so positioning an uncured tire carcass which has been at least partially toroidally pre-shaped (for example, a radial ply carcass) prior to its positioning in the mold.

Vulcanization molds for curing vehicular pneumatic tire carcasses have long been known in the art. One common type of vulcanization mold is generally referred to as a "clamshell" type mold which essentially comprises upper and lower mold half-sections and an upstanding curing bladder attached to and coaxial with the lower half-section of the mold. With such a mold, a tire carcass is prepared for curing by surrounding the mold bladder with the carcass and by placing one bead region thereof in contact with the interior of the lower half-section of the mold. The upper half-section of the mold is then lowered, initiating the conventional curing sequence.

In the case of conventional bias ply tires of the flat band type, the procedure involved is relatively direct. The uncured tire carcass, which is generally cylindrical in configuration, is positioned around the generally cylindrically shaped bladder, the axial height of which bladder has been preselected to be generally the same as the axially extending height of the cylindrically uncured tire carcass. The top half-section of the "clamshell" may, thus, be simply lowered, simultaneously forcing both the upper bead portion of the cylindrical carcass and the upper portion of the bladder downwardly as the bladder is filled with pressurized steam. Such apparatus has long been acceptable to expand the bladder smoothly and free of wrinkles into the raw tire carcass to enable the latter to be effectively cured.

The advent, however, of radial ply tires has caused substantial difficulties with the aforementioned conventional "clamshell" system. These difficulties are due primarily to the fact that the bladder is generally cylindrical and conventional radial ply tires are usually pre-shaped in the form of a generally toroidal configuration prior to the vulcanization thereof; that is, while they still are raw tire carcasses. As a result, it is difficult to fit the cylindrical bladder into the interior of the toroidally shaped carcass without wrinkling the bladder. It, thus, quickly becomes clear that such conventional apparatus utilized for vulcanizing bias ply, flat belt, cylindrical raw tire carcasses is inappropriate for vulcanizing pre-shaped tires, for example, heavy duty, steel-belted, radial ply tires.

The tire industry, in an effort to avoid the loss of its substantial capital investment in its "clamshell" molds used for curing conventional bias ply tire carcases of the flat band type, has attempted to modify such molds or the systems of which such molds are a portion so as to render them suitable for use in curing pre-shaped tire carcasses, such as radial ply tire carcasses. One example of such a modified mold system is illustrated in U.S. Pat. No. 2,997,738. This patent teaches the substitution of the aforementioned bladder extending piston by a "double-acting piston"; that is to say, by two pistons connected to the lower mold portion, one piston serving the original purpose of axially extending the bladder so as to enable the positioning thereabout of the pre-shaped uncured tire carcass, and the second piston serving to draw the uppermost portion of the bladder downwardly until it is in alignment with the uppermost bead of the tire carcass.

Although this structure appears to be operable for curing pre-shaped tire carcasses, it has certain drawbacks and disadvantages. Chief among such drawbacks is the fact that the "double-acting piston" cylinder is subject to leakage whereby water, the hydraulic medium used, seeps into the interior of the bladder and interferes with the steam in its effectiveness to uniformly vulcanize the tire carcass. Such leakage or seepage occurs principally when the "double-acting piston" is retracted to fit the bladder into the toroidally pre-shaped carcass.

Another disadvantage is the cost and complexity in modifying the existing "clamshell" molds by substituting "double acting pistons" for the existing "single-acting pistons".

SUMMARY OF THE INVENTION

It is, therefore, an object of the present invention to provide an improved apparatus for positioning an at least partially pre-shaped, uncured tire carcass around a tire curing bladder by means of which the aforesaid drawbacks and disadvantages may be most efficaciously avoided.

It is a particular object of this invention to provide an improved carcass-positioning apparatus in which water leakage into the curing bladder is avoided.

It is yet another object of this invention to provide such an improved carcass-positioning apparatus at a substantially lower cost than has heretofore been possible.

Generally speaking, the objectives of the present invention are achieved by the provision of apparatus for positioning a partially toroidally pre-shaped, uncured tire carcass around a tire curing bladder, which apparatus comprises a lower vulcanization mold half-section, a tire curing bladder connected to, and extending axially of, the half-section, the bladder being inflatable and, thus, both axially and radially expansible and contractible, a tire carcass transporter for positioning a generally toroidally pre-shaped, uncured tire carcass concentrically over and around the bladder, with the bladder in a cylindrical condition of greater axial extent than the carcass, and bladder-control means supported by the tire carcass transporter for urging the upper end of the bladder toward the lower mold half-section to fit the bladder into the tire carcass so that the bladder assumes a complementing substantially toroidal configuration for subsequent carcass-curing purposes.

BRIEF DESCRIPTION OF THE DRAWINGS

The foregoing and other objects and features of the present invention will be more clearly understood from the following detailed description thereof when read in conjunction with the accompanying drawings, in which.

DETAILED DESCRIPTION OF THE INVENTION

Figure 1:
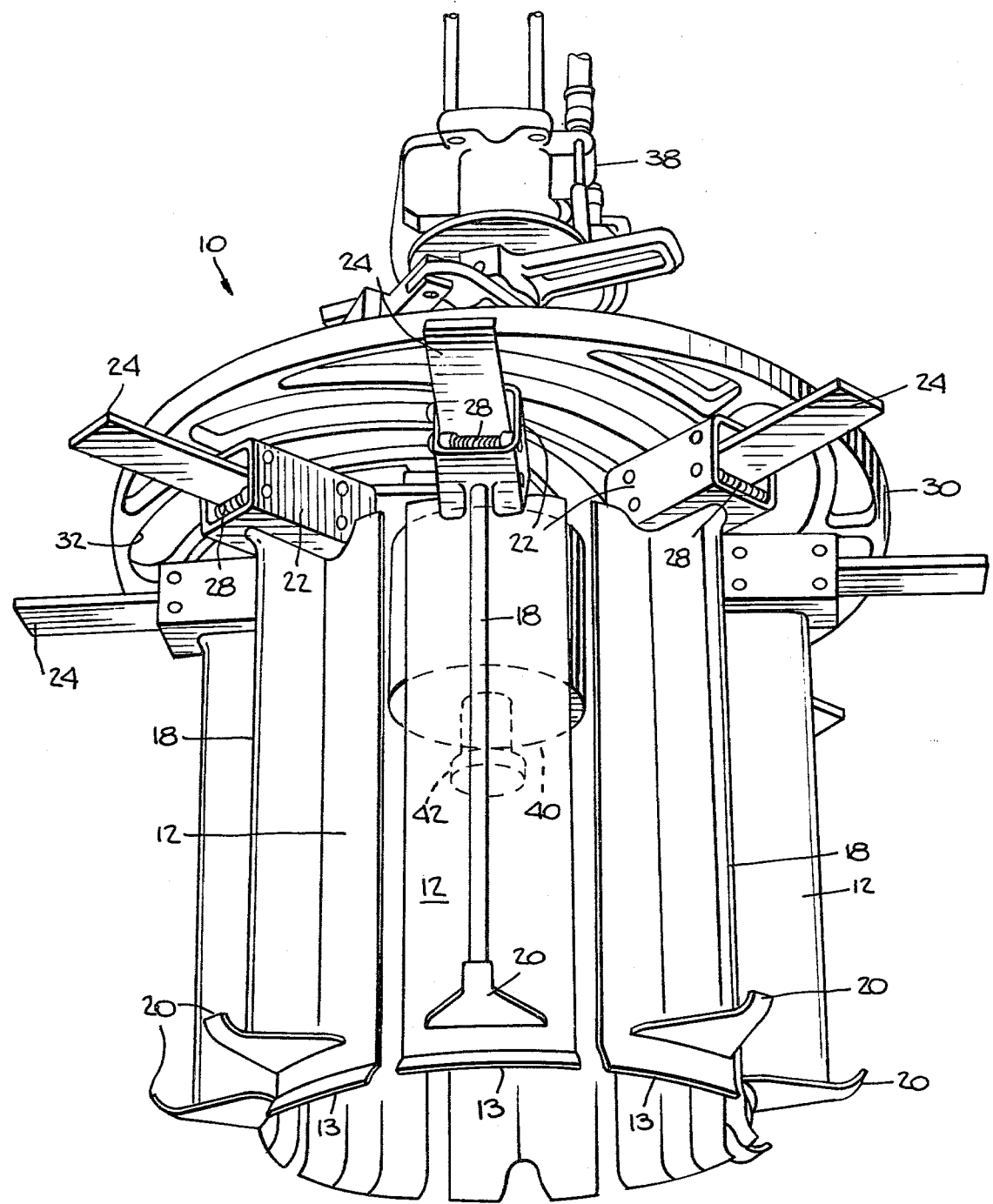
FIG. 1 is a perspective view of the tire carcass transporter including the bladder control means of the invention.

Referring now to the drawings, and more particularly to FIG. 1, the apparatus according to the present invention includes a tire carcass transporter or chuck generally denoted by the reference character 10. The chuck 10 may be in part of the type disclosed in U.S. Pat. No. 2,997,738, issued on Aug. 29, 1961, or U.S. Pat. No. 3,380,115, issued on Apr. 30, 1968, or still yet otherwise conventional in part.

Figure 2:
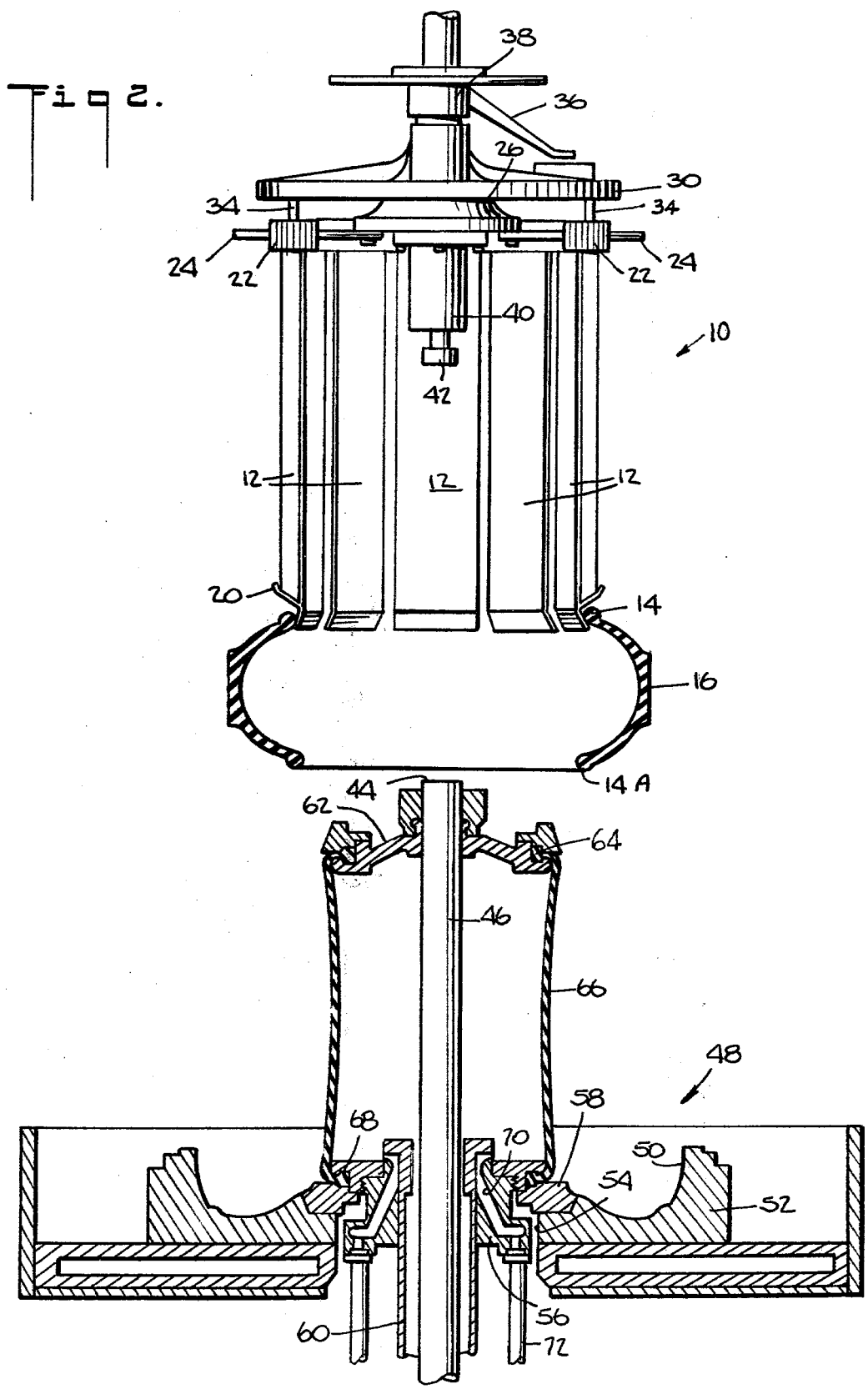
FIG. 2 is a partially sectioned elevational view illustrating the lower half-section of a vulcanization mold in its open position exposing the tire curing bladder in a cylindrical condition, and the tire carcass transporter illustrated in FIG. 1 gripping a partially toroidally preshaped uncured tire carcass.

In particular, the chuck 10 includes a circumferential array of similar, equidistantly spaced, segments 12 that at their respective lower lips 13 are arcuate in horizontal cross-section for cooperatively gripping a bead 14 of a tire carcass 16 (FIG. 2). The segments 12 each include a vertical stabilizing and reinforcing rib 18 that extends from a respective lower bead-engaging flange 20 upwardly to a respective cam-sensitive, follower housing 22 fixedly secured to each segment 12.

Each of the housings 22 is shiftable in a radial direction along a respective one of a plurality of guide bars 24 that present a stationary radial array and project through the housings 22, respectively. The bars 24 are affixed to a central support 26 (FIG. 2) in cantilevered fashion. To facilitate movement of the housings 22 along their respective bars 24, each of the housings is provided internally with an upper and lower roller system (only the lower one of which is illustrated at 28) that embrace cooperatively respective ones of the bars 24.

Also mounted on the central support 26 is a cam plate 30 (FIG. 2) having spiral-like slots 32 associated, respectively, with the housings 22 via upstanding follower pins 34 (FIG. 2) affixed to the housings 22, respectively. The cam plate 30 is rotatable relative to the central support 26 and driven, for example, by a crank 36 associated with a motorized unit, in part illustrated at 38.

Illustrated in phantom in FIG. 1, and in solid line in FIG. 2, is a power cylinder or jack unit 40 that is affixed to the central support 26 and is arranged concentrically within the circumferential array of segments 12. The jack unit 40 is provided with a protractable-retractable piston rod 42, the free end 44 of which is axially engageable with the free end 44 of a piston rod 46 associated with the lower half-section 48 of a tire carcass vulcanization mold (the upper half-section of the mold is not shown, but is understood to be complemental to the lower half-section in a conventional manner). The jack unit 40 may be of the "single-acting" variety in that it is only capable of itself protracting the piston rod 42, or it may be of the "double-acting" variety in that it can itself protract and retract the piston rod 42.

As shown in FIG. 2, the lower half-section 48 includes an annular concavity 50 of semi-toroidal configuration that is formed in an annular section 52. Projecting through a central opening 54 in the section 52 is a sleeve 56 that is fixedly secured to the section 52 in a conventional manner, for example, at 58. Secured fixedly to the sleeve 56, internally thereof, is one end of a tube 60 that communicates at its opposite end with a power cylinder or jack (not shown). Extending through the tube 60, and movable relative thereto, is the piston rod 46 that is associated with the latter said jack (not shown). The piston rod 46 is so controlled by the latter said jack that it, the piston rod 46, is only protractable by the jack and is not retractable by the latter. As such, the piston rod 46 is controlled by a "single-acting" jack and not by a "double-acting" jack that is capable of itself protracting and retracting its associated piston rod.

Affixed to the upper end 44 of the piston rod 46 is a plate 62. The periphery of the plate 62 secures in air-tight relation a circular edge 64 of a conventional cylindrical bladder 66 used for vulcanizing tire carcasses. The opposite circular edge 68 of the bladder 66 is in air-tight relation affixed to the sleeve 56 in a conventional manner.

Formed in the sleeve 56 is one or more channels 70 that communicate at one end with the interior of the bladder 66 and at the opposite end with respective conduits 72 utilized for directing the flow of, for example, pressurized steam into and out of the bladder 66 to effect carcass vulcanization.

In operation, the tire carcass transporter or chuck 10 is initially out of axial alignment with, and remote from, the lower mold half-section 48. As such, the segments 12 of the chuck 10 can be moved inwardly so as to reduce the diameter of the circumferential array they form, via the cam plate 30, to a small enough condition for penetrating a bead 14 of a pneumatic tire carcass, for example, the carcass 16. The cam plate 30 can then be turned to expand the circumferential array of segments 12 so that the lower lips 13 can appropriately grip the bead 14 of the carcass 16. The chuck 10 can then be raised, by conventional means not shown, and moved proximate to, and into axial alignment with, the lower mold half-section 48. Such a condition is illustrated in FIG. 2.

At such time, the piston rod 46 can be protracted upwardly so as to cause the bladder 66 to assume a substantially cylindrical condition small enough for the lower bead 14A of the carcass 16 to be moved into surrounding relation therewith, via the chuck 10. In order to facilitate movement of the carcass 16 into surrounding relation with the bladder 66, a slight vacuum is created in the bladder 66 to cause the cylindrical wall thereof to move inwardly slightly toward the piston rod 46. Such a vacuum can be created by conventional means associated in a conventional manner with the channels 70 and conduits 72, or by any other means of conventional nature not shown.

Figure 3:
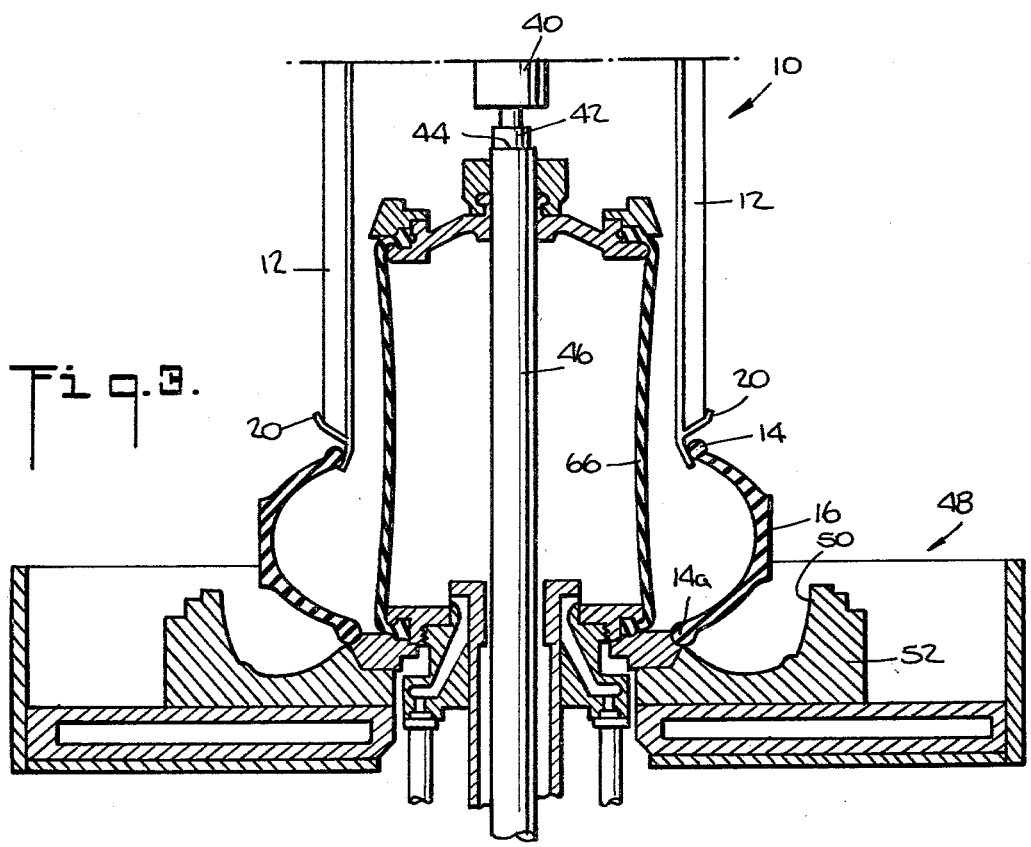
FIGS. 3-6 are fragmented, sectional view of the apparatus in FIG. 2, illustrating the successive positions of the tire carcass transporter relative to the lower half-section of the mold in the course of positioning the carcass around the bladder and upon the lower half-section.

The chuck 10 can then be lowered, as illustrated in FIG. 3, so that the lower bead 14A of the carcass 16 engages the section 52 of the lower mold half-section 48. The vacuum in the bladder 66 is then released, and steam under pressure is introduced into the bladder 66. The piston rod 42 of the jack 40 associated with the chuck 10 is then protracted to axially engage and cause the retraction of the piston rod 46 associated with the bladder 66.

Figure 4:
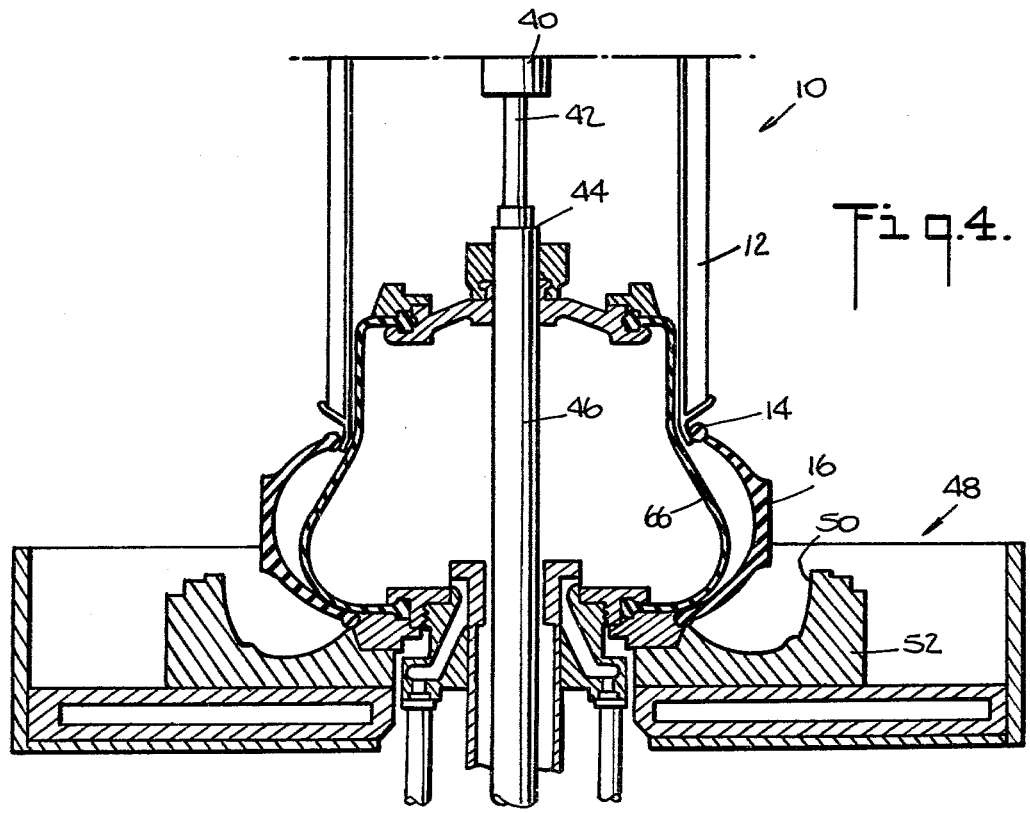
Figure 5:
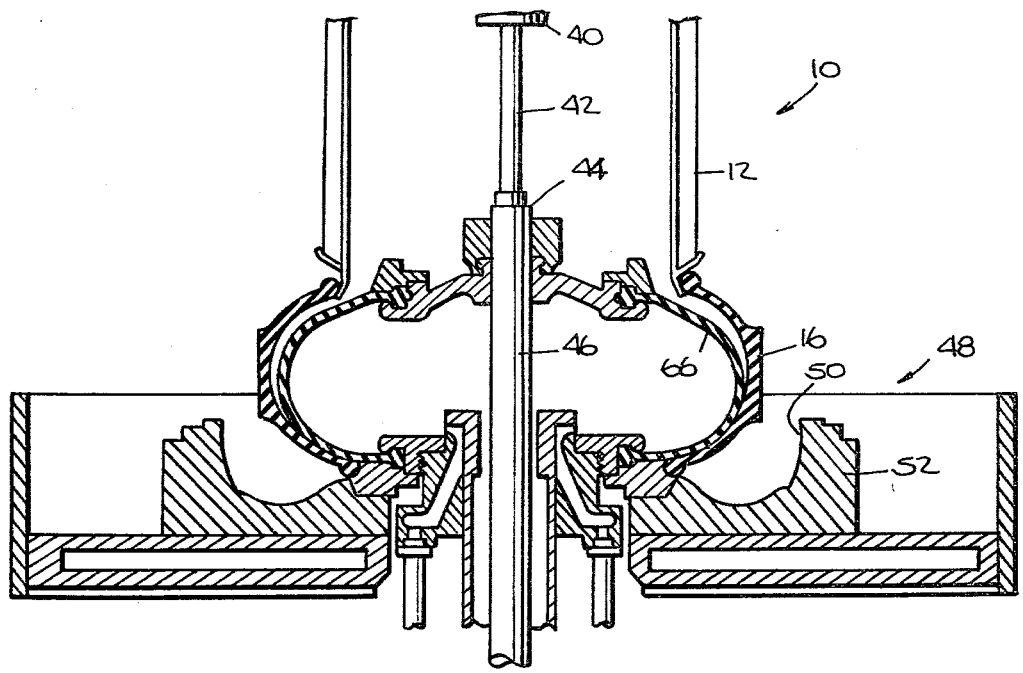
Figure 6:
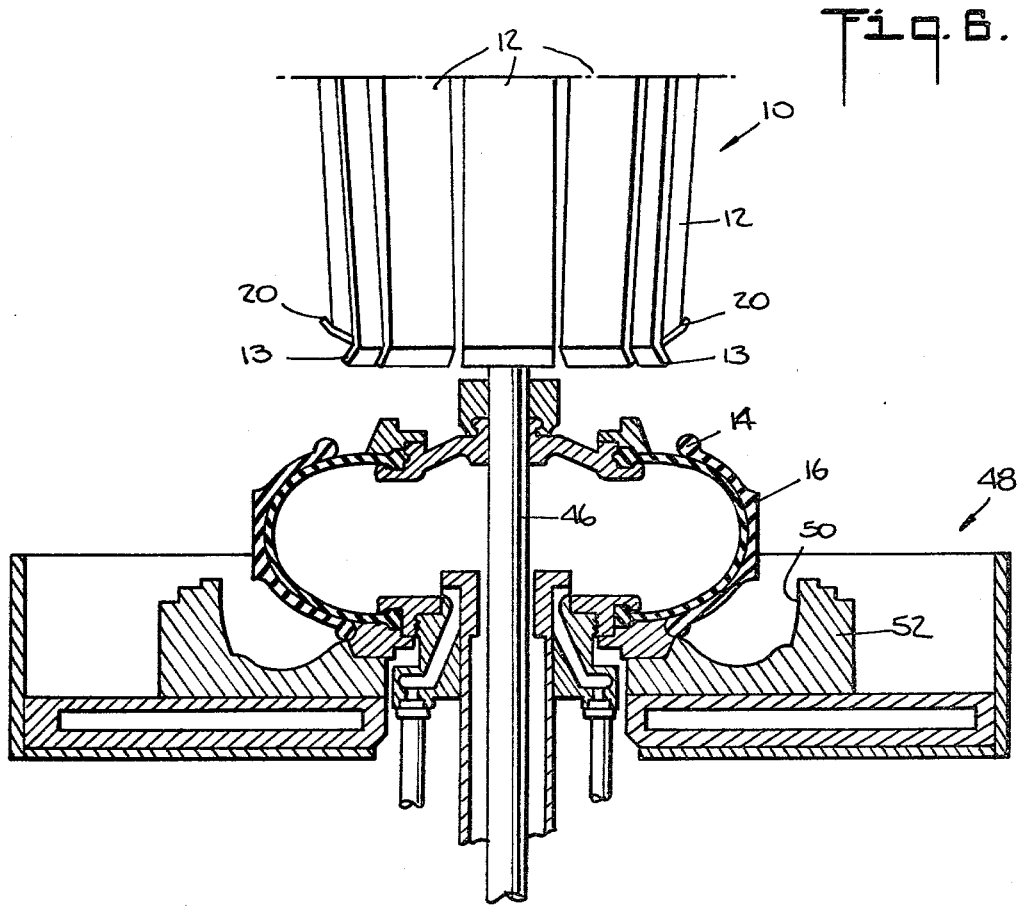

As the piston rod 46 retracts, the bladder 66, filled with pressurized steam, begins to gradually conform to the internal surface configuration of the carcass 16 so that it, the bladder 66, also assumes a somewhat toroidal configuration. The gradual conformation of the bladder 66 to the interior of the carcass 16 is shown successively in FIGS. 4–6.

Although not illustrated, an upper mold half-section of conventional design can be lowered onto the lower mold half-section 48 to effect further deformation of the bladder 66 and carcass 16 into a final toroidal shape for vulcanization. Of course, the chuck 10 is removed from the vicinity of the lower mold half-section 48 before the latter is closed by its associated upper mold half-section (not shown).

The significance of the present invention lies in the arrangement of the jack 40 and its associated protractable-retractable piston rod 42 within the circumferential array of segments 12 of the chuck 10. As such, the piston rod 42 is axially engageable with the piston rod 46 associated with the lower mold half-section to effect the retraction of the piston rod 46 independently of the jack (not shown) associated with the piston rod 46. As a result, the prime mover (the piston rod 42) for causing the bladder 66 to conform to the interior a the carcass 16 is isolated from the interior of the bladder 66 and cannot be the cause of leakage of its hydraulic or pneumatic medium into the bladder 66, which would otherwise interfere with the steam in the bladder 66 to uniformly vulcanize the carcass 16.

This is to be distinguished from the conventional association of the piston rod 46 with a "double-acting" jack capable of both protracting and retracting it. If such a conventional jack were employed, the hydraulic medium (usually water) associated with it would run along the length of the piston rod 46 and seep into the bladder 66 when the piston rod 46 is retracted. The present invention obviates this possibility since retraction of the piston rod 46 is a function of the protraction of the piston rod 42 which is isolated therefrom and, thus, from the bladder 66.

Having thus set forth the nature of the present invention, it will be understood that the foregoing description of a preferred embodiment of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. Apparatus for inserting a bladder of a pneumatic tire vulcanization mold into a pre-shaped partially toroidal raw tire carcass, said apparatus comprising:

transporter chuck means for detachably gripping a first bead of said carcass, said chuck means including a circumferential array of similar and equidistantly spaced segments and control means for selectively increasing and decreasing the effective diametral condition of said circumferential array of segments into and out of engagement with said first carcass bead;

a vulcanization mold section for vulcanizing said carcass into a final toroidal form, said mold section having means for engaging a second carcass bead; said mold section including at its center an endwise movable first piston rod having a free end portion concentrically arranged therein and movably axially relative thereto;

an inflatable vulcanizing bladder capable of assuming both a cylindrical and toroidal form surrounding said first piston rod with said free end portion being exterior of the bladder;

said first piston rod including circular plate means concentrically affixed to said free end portion thereof, said bladder having a circular edge secured to the periphery of said plate means in airtight relation; said bladder having an opposite circular edge secured to said mold section in air-tight relation;

single-acting means for protracting the first piston rod to cause the bladder to assume the cylindrical form from the toroidal form, the single acting means being exterior to the bladder;

power cylinder means affixed to said transporter chuck means concentrically within said circumferential array of segments, said power cylinder means including a second piston rod having a free end portion that is axially engageable with the free end portion of the first piston rod and thereafter extensible to effect the retraction of the first piston rod and initiate the transformation of the bladder from the cylindrical form to the toroidal form internally of the carcass.

2. Apparatus as claimed in claim 1, wherein said control means of said chuck means includes a rotatable member having cam slots operatively associated with said segments, respectively, for moving the latter selectively.

3. Apparatus as claimed in claim 2, wherein said chuck means includes a radial array of cantilevered members, each of said segments including housing means affixed to one end thereof respectively and loosely surrounding respective ones of said cantilevered members for displacement relative to the latter.

4. Apparatus as claimed in claim 3, wherein each of said housings includes respective follower means operatively associated with a corresponding one of said cam slots.

5. Apparatus as claimed in claim 1, wherein said power cylinder means is affixed to said chuck means such that said second piston rod thereof confronts and is concentric with a carcass bead gripped by said segments.

6. Apparatus as claimed in claim 1, wherein said piston rod of said second power cylinder means has a stroke sufficient to effect the retraction of said first piston rod associated with said mold section over an axial extent that is sufficient to transform said bladder from a cylindrical configuration to a toroidal configuration fully complementing the internal configuration of said carcass.

7. Apparatus as claimed in claim 1, wherein said power cylinder means is pneumatically actuated.

8. Apparatus as claimed in claim 1, wherein said power cylinder means is hydraulically actuated.

9. Apparatus as claimed in claim 1, including suction means operatively associated with the interior of said bladder.

10. Apparatus as claimed in claim 1, wherein said power cylinder means is a single-acting jack.

11. Apparatus as claimed in claim 1, wherein said power cylinder means is a double-acting jack.

12. Apparatus as claimed in claim 1 wherein the segments surround the bladder and control the radial expansion of the bladder.

* * * * *